United States Patent [19]

Gillett et al.

[11] Patent Number: 4,803,609
[45] Date of Patent: Feb. 7, 1989

[54] D. C. TO D. C. CONVERTER

[75] Inventors: John B. Gillett, Woodstock; James H. Spreen, Stone Ridge, both of N.Y.

[73] Assignee: International Business Machines Corporation, Armonk, N.Y.

[21] Appl. No.: 191,822

[22] Filed: May 2, 1988

Related U.S. Application Data

[63] Continuation-in-part of Ser. No. 81,401, Aug. 4, 1987, abandoned, which is a continuation-in-part of Ser. No. 793,520, Oct. 31, 1985, abandoned.

[51] Int. Cl.⁴ .......................................... H02M 3/335
[52] U.S. Cl. .................................... 363/17; 363/48; 323/305
[58] Field of Search ............... 336/181, 182, 185, 214, 336/215; 333/177; 363/17, 20, 21, 45, 47, 48; 323/305, 359, 363

[56] References Cited

U.S. PATENT DOCUMENTS

| | | | |
|---|---|---|---|
| 3,419,834 | 12/1968 | McKechnie et al. | 336/69 |
| 3,553,620 | 1/1971 | Cielo et al. | 336/165 |
| 4,241,395 | 12/1980 | Stacey et al. | 363/39 |
| 4,257,087 | 3/1981 | Cuk | 363/16 |
| 4,274,133 | 6/1981 | Cuk et al. | 363/45 |
| 4,367,450 | 1/1983 | Carillo | 336/232 |
| 4,422,056 | 12/1983 | Roberts | 336/215 |

FOREIGN PATENT DOCUMENTS 2031657 4/1980 United Kingdom ................ 336/182

OTHER PUBLICATIONS

Higuchi et al. Controlled Ferroresonant Power Supply With Linear Gain IBM Technical Disclosure Bulletin vol. 19, No. 1, Jun. 1976, pp. 294–295.

Primary Examiner—Patrick R. Salce
Assistant Examiner—Judson H. Jones
Attorney, Agent, or Firm—Robert L. Troike; Frederick D. Poag

[57] ABSTRACT

A d.c. to d.c. converter system converts a d.c. signal into a pulsating a.c. signal, which is applied to the primary of a power transformer. A transformer in which the primary and secondary windings are planar is employed to generate the output pulse signal. The planar transformer design provides the inductance required to filter the output signal and reduce the ripple therein, while simultaneously providing tight coupling between the primary and secondary windings. A single turn secondary winding is provided to reduce the number of turns in the transformer and thereby reduce the associated power loss.

6 Claims, 7 Drawing Sheets

FIG. 1

FIG. 2
SINGLE ENDED FRONT END

FIG.3 BRIDGE FRONT END

D. C. TO D. C. CONVERTER

CROSS REFERENCE TO RELATED APPLICATIONS

This application is a continuation-in-part of Application Ser. No. 07/081,401" "D.C. to D.C. Converter" filed Aug. 4, 1987, now abandoned which is a continuation-in-part of application Ser. No. 06/793,520, "D.C. to D.C. Converter", filed under 37 C.F.R. 1.63 by John B. Gillett et al Oct. 31, 1985 now abandoned.

FIELD OF THE INVENTION

The present invention relates to a d.c. to d.c. energy conversion system and more particularly to an energy conversion system utilizing a modified transformer inductor configuration for producing a d.c. signal having a ripple component less than a predetermined value.

DESCRIPTION OF THE PRIOR ART

In d.c. to d.c. conversion systems, d.c. power is applied through a single ended (asymmetrical) or symmetrical drive circuit, where it is converted into pulse signals which are in turn applied to the primary winding of a power transformer. The transformer converts the pulse signals to the desired level and then applies them through a rectifier to a filtering circuit generally comprising an LC inductance/capacitance filter. Problems in this conventional system include tight coupling requirements in the output transformers, ripple in the transformer output signals and substantial large filtering circuitry to eliminate or substantially reduce the ripple. High currents in large power transformers contribute to significant power losses within the transformer structure.

SUMMARY OF THE INVENTION

In accordance with the instant invention, an improved d.c. to d.c. converter employs a modified transformer-inductor construction which provides the normal power transformer function and some or all of the inductor filter function to thereby reduce the ripple of the rectified current. A planar winding configuration using a center tapped single turn secondary winding provides a tightly coupled transformer and inductor combination. The preferred embodiment of the invention is described in terms of a single ended asymmetric drive associated with the primary winding of the transformer, but the invention is also adaptable in a power supply with a symmetric drive.

Accordingly, it is an object of the present invention to provide an improved d.c. to d.c. converter.

Another object of the present invention is to provide an improved d.c. to d.c. converter using a planar winding tightly coupled transformer and inductor combination having a single turn secondary winding which reduces the ripple component in the rectified output.

The foregoing and other objects, features and advantages of the invention will be apparent from the more particular description of the preferred embodiments of the invention, as illustrated in the accompanying drawings.

BRIEF DESCRIPTION OF THE DRAWINGS

In the drawings, like elements are designated by corresponding reference numbers, and identical elements in different specific embodiments are designated by identical reference numbers with a prime or super-prime descriptor added.

DESCRIPTION OF PREFERRED EMBODIMENTS OF THE INVENTION

Figure 1:
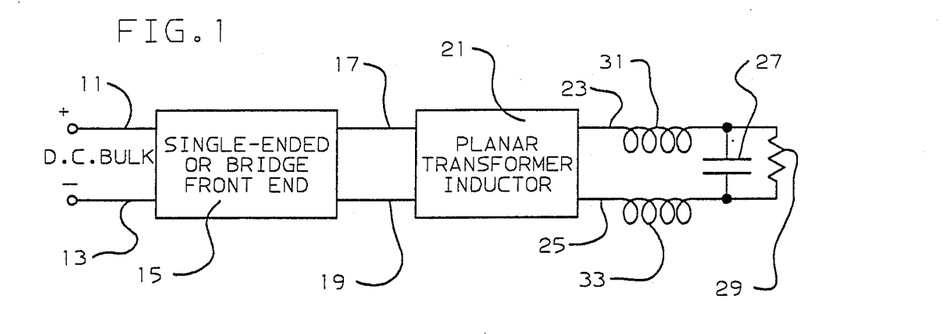
FIG. 1 is a block schematic/diagram of a power generating system utilizing the instant invention.

Referring now to the drawings and more particularly to FIG. 1 thereof, a block diagram of a d.c. to d.c. converter is illustrated. A d.c. bulk voltage, which may be, by way of example, 200 volts, is applied through conductors 11 and 13 to a single ended dual switch or symmetric bridge front end circuit 15 shown and described in greater detail hereinafter. The d.c. bulk voltage is converted to a pulse wave train having a frequency in the preferred range of 100 to 200 kilohertz, which is then applied through output conductors 17 and 19 to a planar transformer inductor device 21 more fully described hereinafter. The resultant output signals from the transformer inductor on an order of magnitude of approximately 5-10 volts but a current in the range of 200 amperes, are applied through rectifiers 77 and 79 (FIG. 4) to output terminals 23 and 25 to a load filtering capacitor 27 and a load illustrated as resistor 29. While the planar transformer inductor 21 includes inductance used to filter the signal on the transformer secondary, additional inductance, if required, and indicated by inductors 31 and/or 33 may be utilized.

Figure 2:
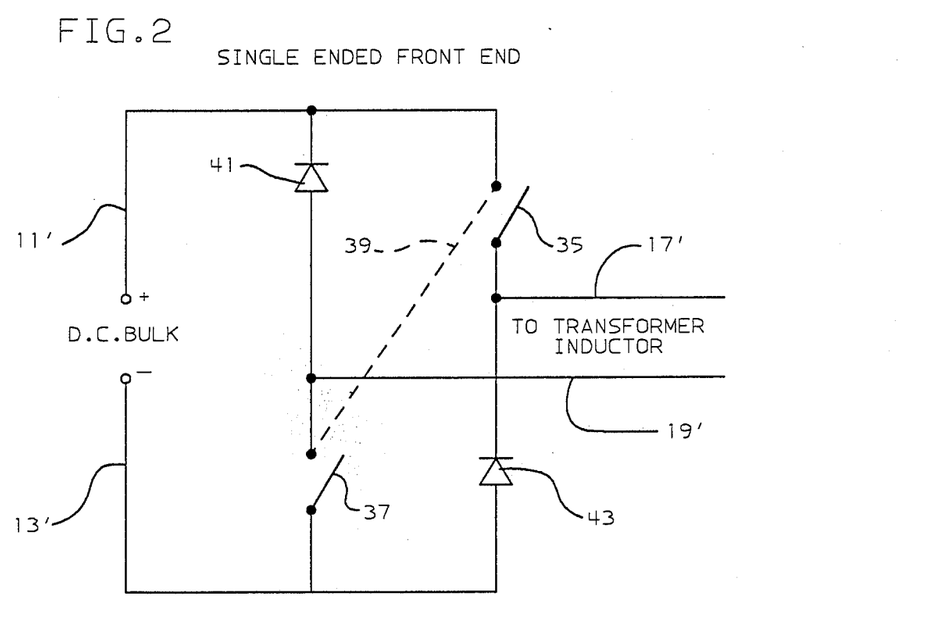
FIG. 2 is a schematic diagram of a conventional asymmetric dual switch system associated with the transformer primary winding.
Figure 3:
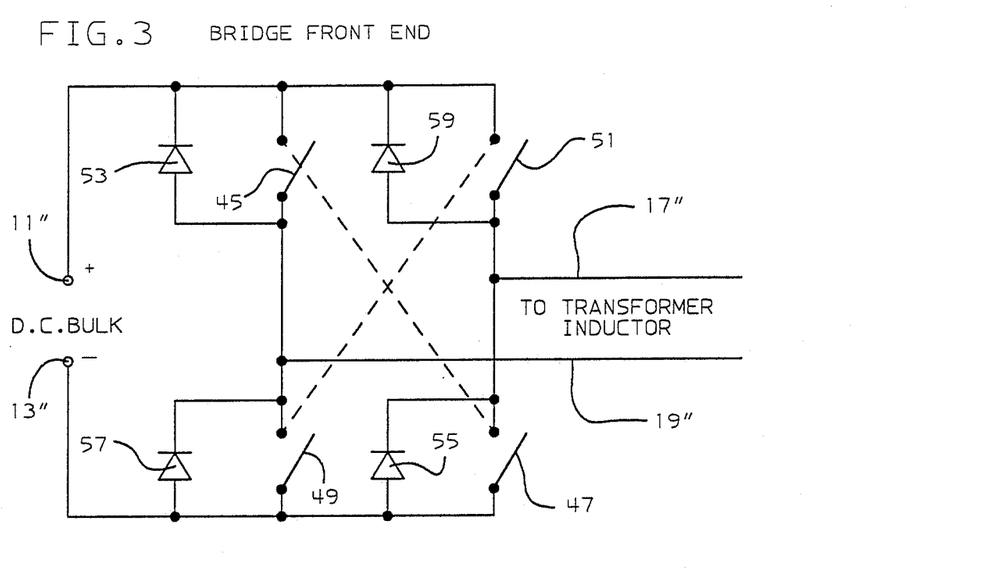
FIG. 3 is a schematic diagram of a conventional symmetric full bridge rectifier associated with the transformer primary winding.

The instant invention is designed to operate within a switch mode power supply (SMPS) mode in which the initial conversion from d.c. bulk voltage to a pulsating voltage is provided either within a single ended dual switch asymmetric half bridge, as illustrated in FIG. 2, or a symmetric full bridge rectifier, as illustrated in FIG. 3. It will be understood by those skilled in the art that other asymmetric or symmetric drive systems may be employed. In FIGS. 2 and 3, the input and output terminals corresponding to FIG. 1 are indicated in script or superscript identifiers to correspond to the showing in FIG. 1.

Referring now to FIG. 2, the d.c. bulk voltage is applied via conductors 11' and 13' across switches 35 and 37 which are coupled to operate simultaneously, as indicated by dotted line 39. Switches 35 and 37 are illustrated as mechanical switches for ease of description, although it will be appreciated that in practice they are conventional electronic switches, one specific embodiment being FET (field effect transistor) switching circuits. When switches 35 and 37 are closed, positive pulses corresponding in amplitude to the d.c. bulk voltage and in duration to the time the switches are closed will be applied to output conductors 17' and 19' respectively. When pairs of switches are operated simultaneously, a fast transient secondary current signal is generated by transformer 21 (FIG. 1), but the amplitude of the primary voltage spike is controlled by clamping diodes 41 and 43, which clamp the primary signal to the voltage level corresponding to the d.c. bulk voltage. The resulting pulse signals are then applied via conductors 17' and 19' to planar transformer inductor 21. The above described bridge circuit is considered conventional and known in the art.

Referring briefly to FIG. 3, a conventional symmetric full bridge rectifier comprising switches 45, 47 and 49, 51 which are coupled as indicated by the dotted lines have associated clamping diodes 53, 55 and 57, 59 respectively. During each sequence of the electronic switches controlled from an external source such as a clock or timing pulse generator, an output signal of twice the frequency as the signal in the dual switch front end is provided. While functionally the single ended or symmetrical bridge front end may be deemed as equivalents to provide the input to the transformer, the invention will be described in terms of the preferred embodiment dual switch primary circuit illustrated in FIG. 2.

The instant invention is described in terms of high power circuits having low voltage requirements of 5 to 10 volts but high currents of 100 to 200 amperes from transformers designed to carry this level of power. With high current transformers, it is desirable to reduce the number of transformer turns to a minimum, since the copper loss for even a limited number of turns can be significant. However, in a step-down transformer, the number of turns on the windings is also a function of the turns-ratio of the transformer required to reduce the input voltage to correspond to the desired output level. Another requirement of power transformers is that they be tightly coupled, i.e., that the primary and secondary windings be physically positioned as close as possible to reduce the leakage inductance. Other problems associated with conventional transformer action include the LC filters utilized at the output of the transformers to filter the ripple voltage which may vary the output voltage beyond specified control limits for the power signal.

Power transformers used in d.c. to d.c. converters comprise much of the physical bulk in conventional converters. To reduce the current ripple generally requires large inductors and capacitors, and the variation between the size of the capacitor and the inductor in the filter represents a trade-off in that, generally speaking, one filtering element tends to vary inversely in size with the other. These problems are solved in the instant invention by a novel planar transformer which also provides some or all of the inductance required in the output filter while providing a tightly coupled transformer and inductor combination.

Figure 4:
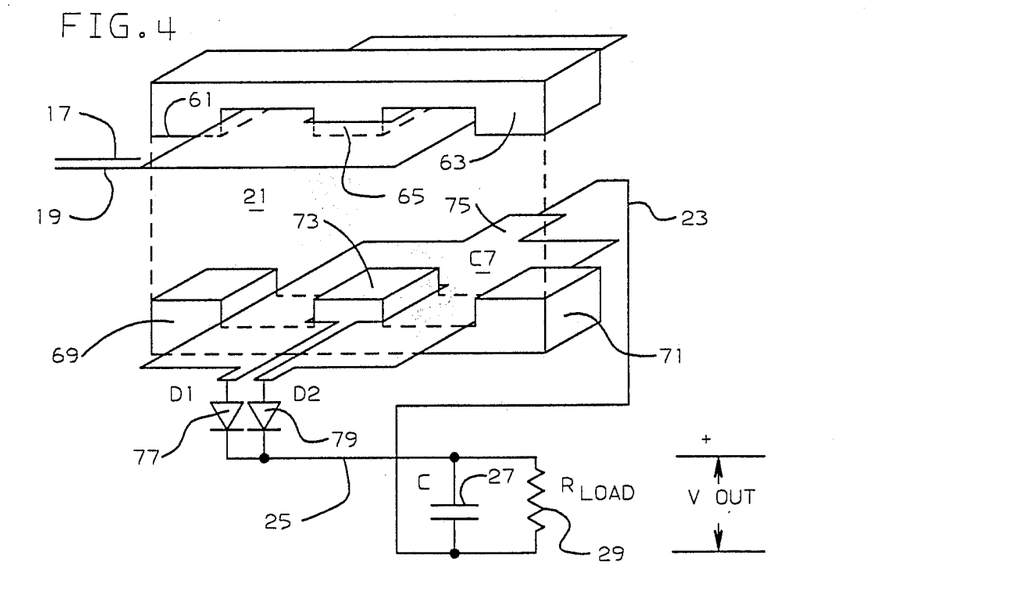
FIG. 4 is an exploded perspective view of a planar transformer-inductor configuration.

Referring now to FIG. 4, a planar transformer 21 is illustrated in an open exploded position for purposes of clarity. Input conductors 17 and 19 are connected to the primary winding 81 of the transformer/inductor. The core, as illustrated, comprises outer legs 61 and 63 and an inner leg 65 interconnected in a conventional E core configuration. While primary widing 81 of the transformer structure is shown as a single winding in the interest of clarity, it will be appreciated that in practice it comprises a multiturn winding configuration of the type illustrated in FIG. 7. The secondary structure comprises a single winding in the form of a conductive sheet 67 of copper, for example, positioned between outer legs 69, 71 and around center leg 73. For reasons more fully described hereinafter, the transformer secondary winding is center tapped at position 75 and connected to output line 23, while the two conducting paths 83, 85 are connected through secondary rectifiers 77, 79 respectively to output conductor 25. The output signal is then filtered through capacitor 27 and applied to load 29 as illustrated in FIG. 1 add FIG. 4.

The single magnetic component 21 performs both the transformer function and the output filter inductor function in a "forward" converter. Conceptually, the single primary winding 81 may be driven either single-ended (as with a dual switch circuit) or asymmetric half-bridge circuit, or symmetrically (as with a bridge circuit), although, in practice, different "limbs" of the core may need to be different sizes to accommodate the two different flux distributions resulting from these two generic types of primary drives.

The magnetic core and the secondary structure are arranged such that a significant portion of the core volume contains magnetic fields proportional to the sum of the currents in the secondary conducting paths 83 and 85. These currents flow through rectifiers 77 and 79 respectively. In operation, the magnetic energy stored in this portion of the core corresponds to the energy stored in an output filter inductor. Thus, it is this arrangement which allows the component to perform the inductor filter function.

The primary and secondary structure are arranged such that the geometric path of the primary amp-turns is nearly identical to the amp-turn pattern of the fast transient (high di/dt) secondary current which effects the rapid commutate or transfer of the output current at the times of the switch transitions. Thus, this arrangement allows the component to perform as a tightly coupled transformer during the critical times of the switch transitions even though each separate conducting path 83 or 85 individually is poorly coupled to the primary winding.

By utilizing a single turn secondary structure, the number of turns of the primary winding can be limited to the value of the required turns ratio, which, in a typical embodiment, may be 20. The primary winding configuration for example, can be wound on a single plane in a spiral configuration which provides very close magnetic coupling to the planar secondary structure 67. The elements in the exploded view of FIG. 4 are brought together by positioning the upper half of the core directly over the corresponding portions of the lower core, 61 to 69, 65 to 73 and 63 to 71. In this assembly, it is possible to fabricate the windings in only two planes, one for the primary winding and one for the secondary conductor paths. Further, the structure shown in FIG. 4 provides inductance which aids in filtering the transformer secondary winding output.

Figure 5:
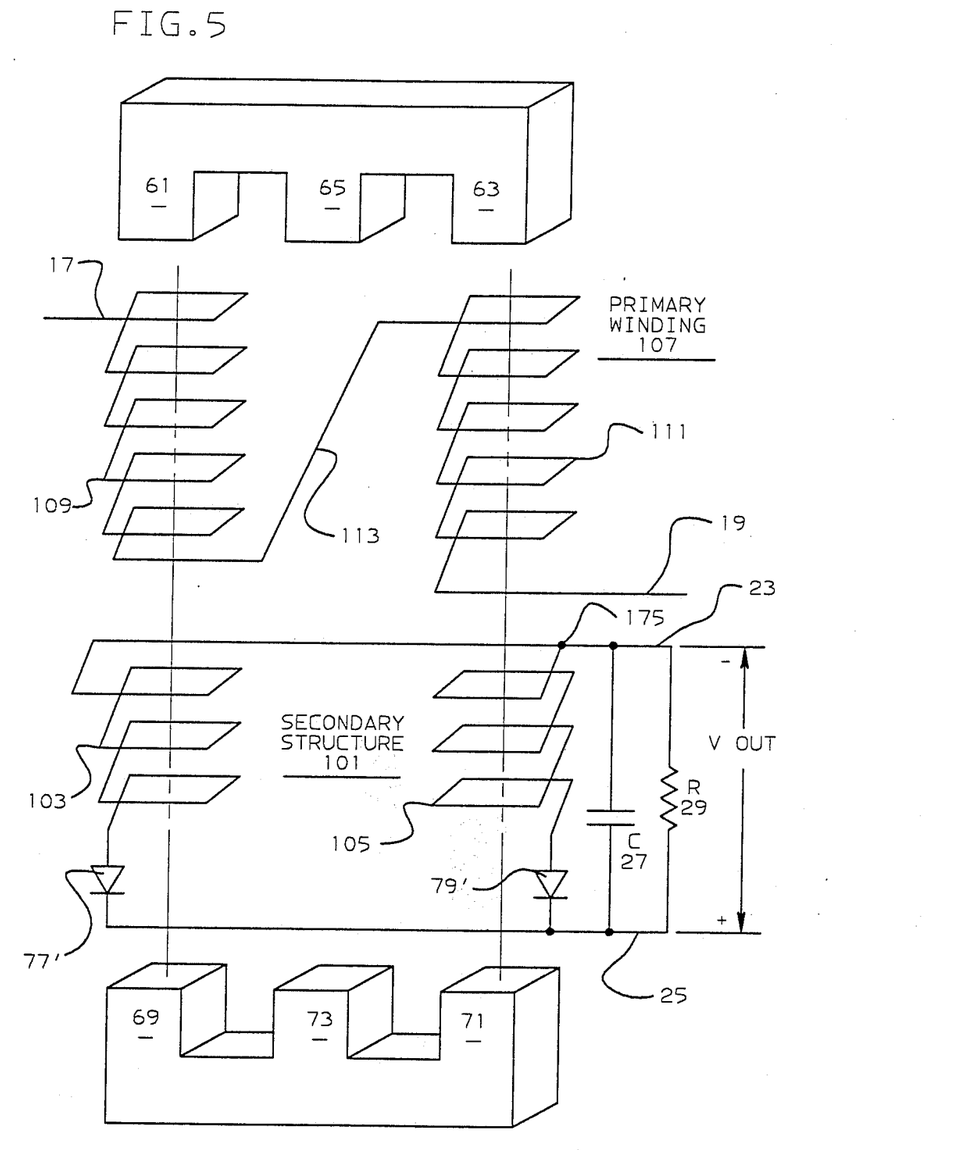
FIGS. 5, 6, and 7 are exploded views of transformer-inductors which employ the essential features illustrated in FIG. 4.
Figure 6:
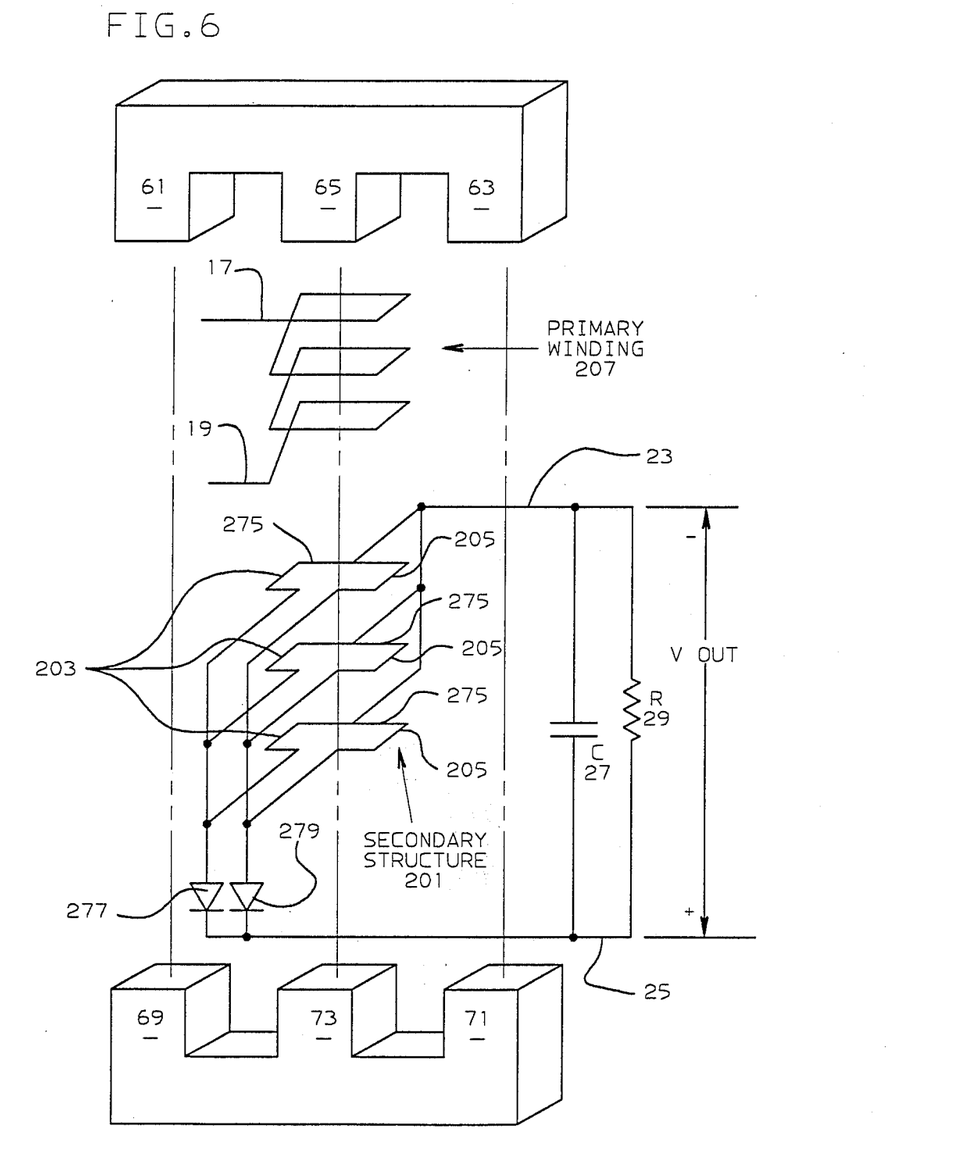
Figure 7:
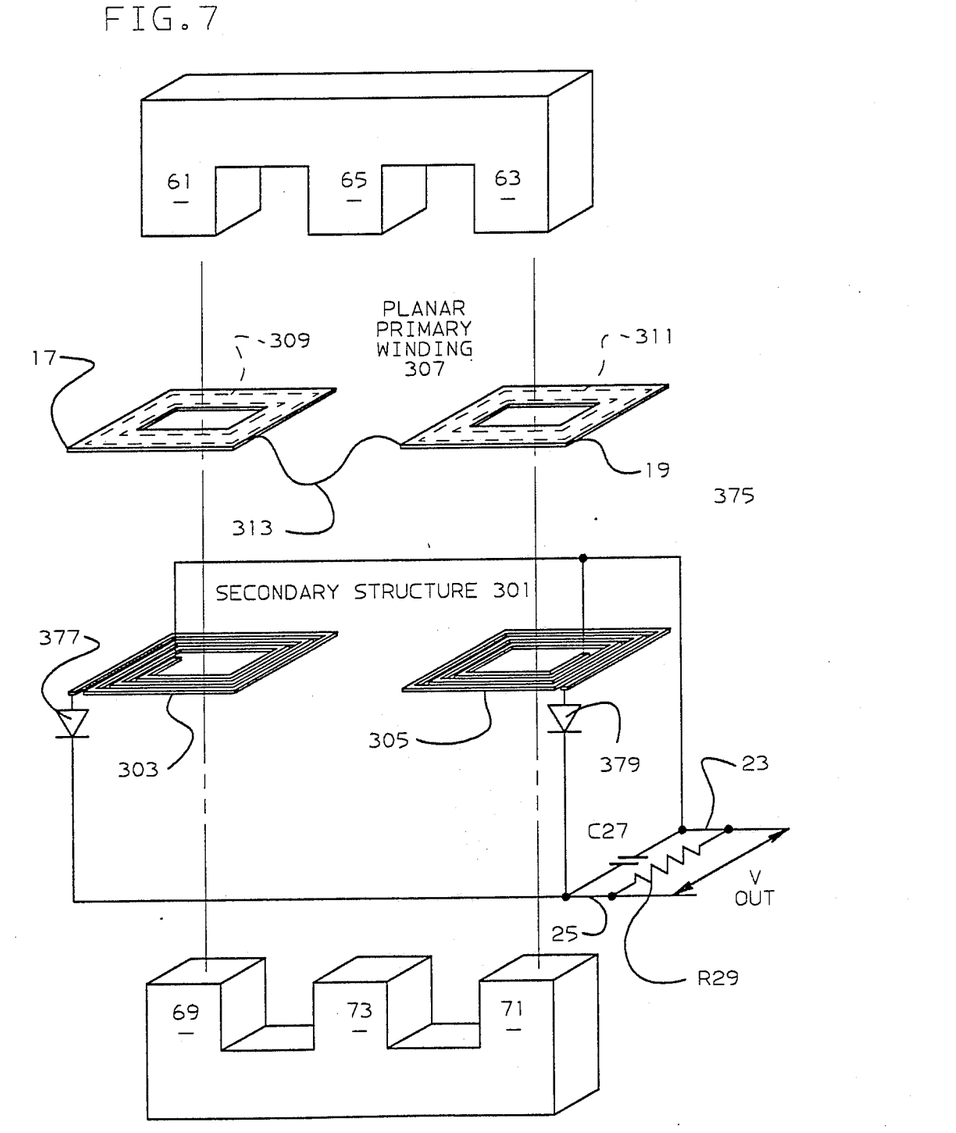

FIGS. 5, 6 and 7 are exploded views of transformer/inductor structures which utilize the essential features described relative to FIG. 4, but employ different winding arrangements. In specific applications, engineering concerns, fabrication practices or packaging constraints may make one style more attractive than the others.

Referring now to FIG. 5, a transformer/inductor with cylindrical windings on the outer legs of the core is illustrated in an exploded view for clarity. The input conductors 17 and 19 are connected to the primary winding 107, which is composed of two portions, 109 and 111, connected in series by connection 113. Each portion forms a cylindrical winding around one of the outer core legs, portion 109 around leg 61-69 and portion 111 around leg 63-71. For purposes of the instant invention, the term "cylindrical" will be construed to incorporate the rectangular winding configuration shown in FIGS. 5 and 6. The secondary structure 101 is composed of two conducting paths 103 and 105, each of which forms a cylindrical winding around one outer leg and is connected to output lead 25 through an output rectifier. Secondary conducting path 103 forms a cylindrical winding around core leg 61-69, is tightly magnetically coupled to primary portion 109, and is connected to output conductor 25 through rectifier 77'. Similarly, path 105 is wound on leg 63-71, tightly coupled to primary portion 111, and connected through rectifier 79' to output conductor 25. The two secondary conducting paths are connected at a common node 75' which, in turn, is connected to output conductor 23.

This arrangement of the secondary structure 101 is such that a significant fraction of the volume of the core contains magnetic fields proportional to the sum of the currents in the separate conducting paths 103 and 105. The magnetic energy stored in this manner corresponds to energy stored in and output filter inductor. Thus, this arrangement causes the component to act as an output inductor.

Each secondary conducting path is tightly coupled magnetically to only a portion of the primary winding. However, the arrangement of the primary winding portions of the secondary conducting paths is such that the fast transient current in the secondary which occurs at switch transitions is tightly coupled to the corresponding fast transient current in the primary. Thus, the component acts as a tightly coupled transformer during the switch transition times, even though there is not tight coupling between either secondary conducting path and the entire primary winding.

FIGS. 6 and 7 illustrate other possible variations in winding arrangements with which the transformer/inductor component may be implemented. FIG. 6 may be regarded as a cylindrical winding version of the transformer/inductor illustrated in FIG. 4, while FIG. 7 may be regarded as a planar winding version of the transformer/inductor illustrated in FIG. 5. Some unique features of these versions are mentioned below. The general aspects are similar to those described above for the transformer/inductors illustrated in FIGS. 4 and 5.

Referring now to FIG. 6, the primary winding 207 is in the form of a cylindrical winding on the core center leg 65-73. The secondary structure 201 consists of a number of layers of conductors connected in parallel. The number of layers in the secondary structure, three in this illustration, is shown equal to the number of turns in the primary winding in order to demonstrate how the tight magnetic coupling may be obtained. Each layer in the secondary structure consists of two conducting paths which pass either side of the central core leg, but do not encircle it. Each of these layers, in its entirety, may be tightly coupled to a turn of the primary winding, although there is not tight coupling between a primary turn and each individual conducting path. The parallel combination of these layers forms two conducting paths 203 and 205, connected at common node 275. Because of the arrangement of each layer with respect to a primary turn, the entire secondary structure is tightly coupled to the primary winding for fast current transients which occur at the times of switch transitions, even though each individual secondary conducting path 203 or 205, connected through output rectifier 277 or 279, is loosely coupled to the primary winding. As in FIG. 4, a significant fraction of the core volume contains magnetic fields proportional to the sum of the currents in conducting paths 203 and 205 (and hence rectifiers 277 and 279). The corresponding energy storage is equivalent to that in an output inductor. Thus, the transformer/inductor of FIG. 6 functions as both a tightly coupled transformer and an output filter inductor.

Referring now to FIG. 7, an exploded view of a transformer/inductor is illustrated with planar style windings on the outer legs instead of the cylindrical windings illustrated in FIG. 5. Thus, the primary winding 307 consists of two planar portions 309 and 311, connected in series by connection 313. Each portion is positioned to be tightly coupled to one of the two conducting paths 303 or 305 which form the secondary structure 301. These secondary conducting paths are connected at a common node 375, which is connected to output conductor 23. Each secondary conducting path, here illustrated as a planar winding having few turns, is connected to output conductor 25 through an output rectifier 377 or 379. Again, this arrangement functions as a tightly coupled transformer for the fast current transients at switch transitions, even though each secondary conduting path is tightly coupled to only a portion of the primary winding. Further, this structure functions as an output filter inductor, in a manner similar to the transformer/inductor of FIG. 5. One of the considerations which determines the amount of ripple current in the output of a switch mode converter is the effect of off time, i.e., the interval between pulses. In the preferred embodiment of the instant invention having a single ended drive, the normal output of the transformer secondary provided by a 20:1 transformer would be 10 volts. However, by center tapping the secondary winding as illustrated, the 10 volt level is reduced to the desired 5 volts level, but the duration of the pulse is doubled, thereby substantially reducing the interval between pulses and thus the ripple filter current. Thus, the effective off time is substantially reduced, the number of turns in the transformer is reduced to a minimum and tight coupling is ensured by the construction illustrated in FIG. 4. A similar effect in operation would be achieved by utilizing the symmetric bridge front end illustrated in FIG. 3 as the transformer primary input, except that no reduction of off time occurs in the symmetric case.

While it is understood that upper half of the core with legs 61, 63, and 65 in FIG. 4 may be gapped from the lower half of the core with legs 69, 71 and 73 for either symmetric drive or single-ended drive, in order to accommodate the dc flux in the core, such a conveniently placed gap interrupts the transformer-like a.c. flux as well as the inductor-like dc flux, so the magnetizing inductance of the transformer is reduced to what may be an unacceptable value. In principle, for single-ended operation only one gap is required, somewhere in the dc flux path. The dc flux is mainly in the center leg and one outer leg, so gapping this outer leg interrupts the dc flux path, while leaving the center leg and other outer leg as an uninterrupted ac flux path.

Figure 8:
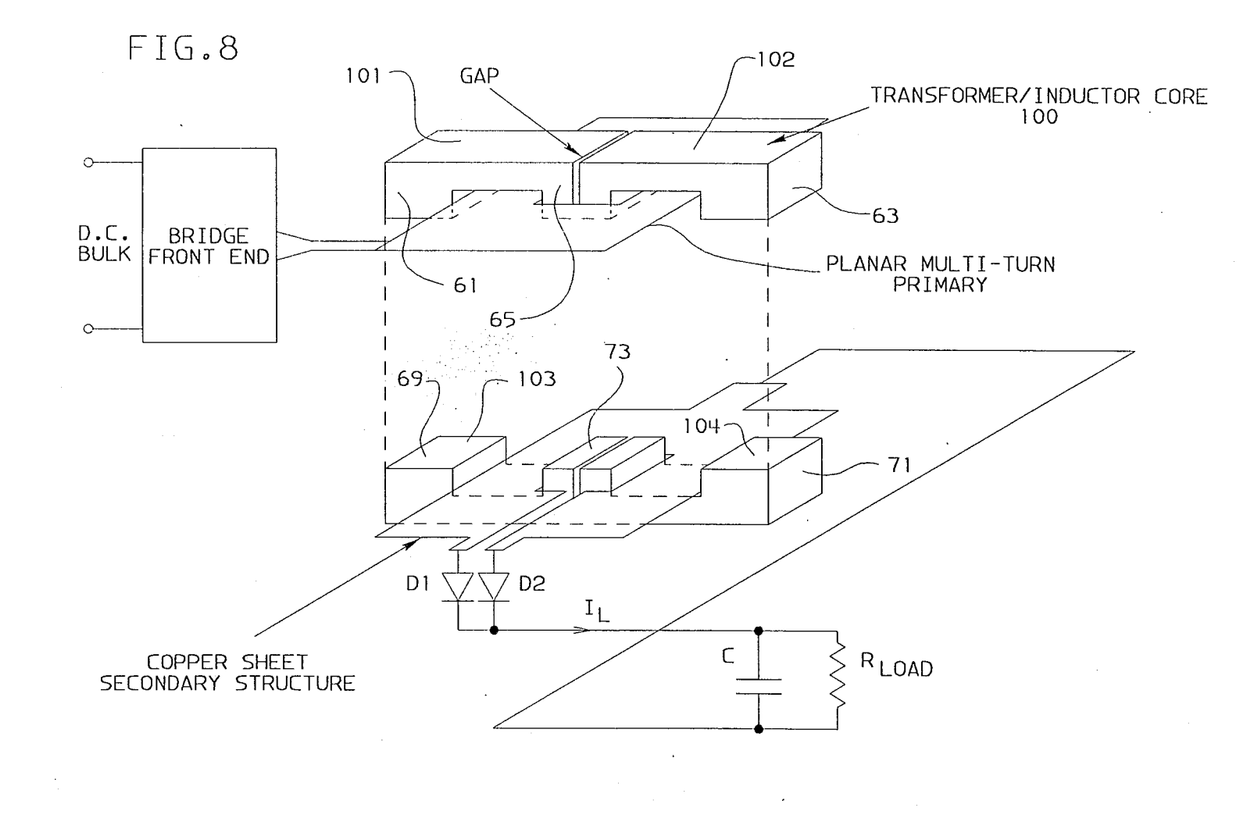
FIG. 8 illustrates the structure of FIG. 4 with the core gapped along the center leg.
Figure 9:
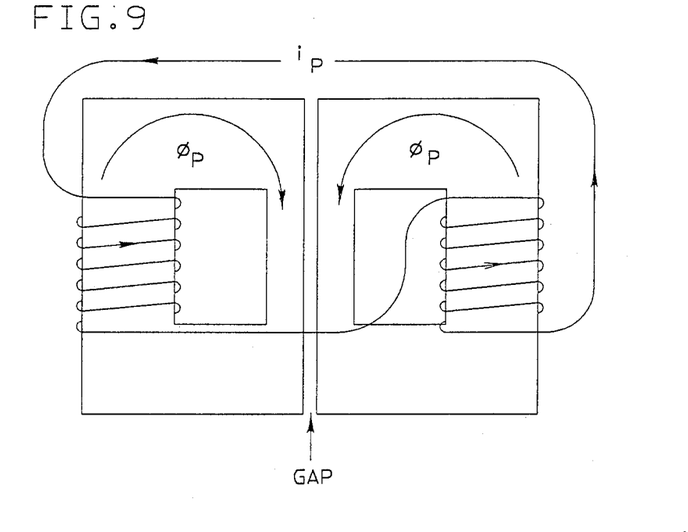
FIGS. 9 and 10 are sketches illustrating the principles of FIG. 8.
Figure 10:
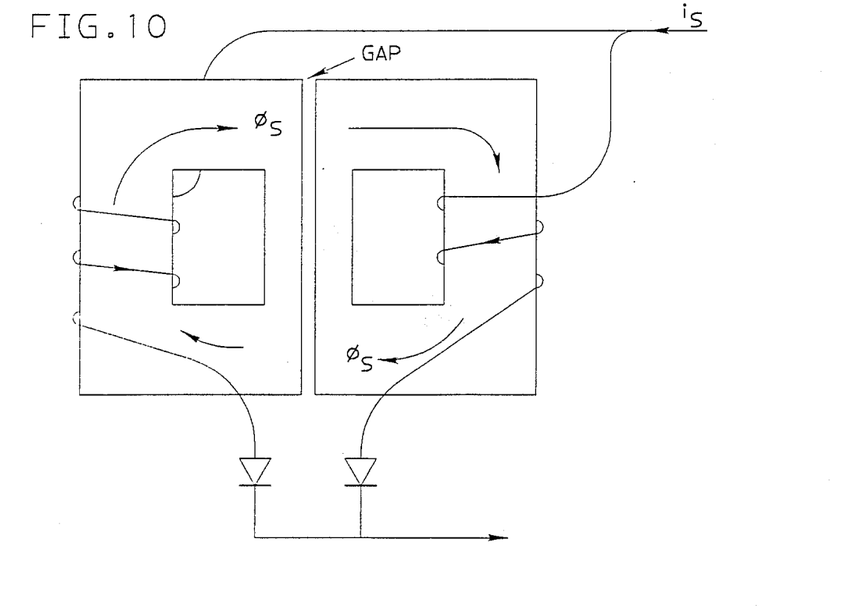

For symmetric (bridge) operation, the magnetic symmetry of the core must be maintained in order to ensure the desired electrically symmetric operation. The dc flux is mainly in the outer legs, so the minimum gapping required is a gap in each outer leg. However, such an arrangement also gaps the ac flux path, with the undesired consequences mentioned above. If the core is gapped along the center leg (65 and 73) as illustrated in FIGS. 8, 9 and 10, then the transformer-like flux is not interrupted, as shown in FIG. 9. The dc flux path, on the other hand, is gapped as shown in FIG. 10.

Clearly, the gap must be chosen with care: if it is too small, the dc flux will saturate the outer coure legs; if it is too large, the two core portions will appear to be separate cores, and the dc flux will return down the center leg halves, saturating these. For particular cases, tapered or stepped gaps, familiar in conventional gap locations, may be appropriate for this gap location. A combination of along and across the leg gaps may be used to advantage.

The upper part of the core 100 in FIG. 8 comprises two closely spaced inverted U-shaped pieces 101 and 102 mounted on two closely-spaced non-inverted U-shaped pieces 103 and 104 to form a core gapped along the center leg (65 and 73).

While the invention has been shown and described with reference to a preferred embodiment thereof, it will be understood by those skilled in the art that various changes in form and details may be made without departing from the scope of the invention.

We claim:

1. A combined power transformer/output filter inductor structure comprising, in combination, a core of magnetic material with two closed flux paths sharing a common segment, a secondary structure, said secondary structure comprising a first and second conducting path joined at a common node, said first and second conducting paths being connected to an external circuit via terminals, which define said first and second conducting paths, a first of said terminals connected to said common node, second and third of said terminals connected to the respective ends of said secondary structure but remote from said common node whereby current flow through said secondary conducting paths in the same direction to or from said common node generates opposing magnetomotive forces in said common segment of said two closed flux paths, and a primary conducting path connected to an external circuit via two terminals, the turns of said primary conducting path additively produce flux in said common segment of said flux path, said primary and secondary conducting paths being positioned in close physical proximity to provide tight magnetic coupling between said primary conducting path and said secondary structure while simultaneously providing significantly weaker magnetic coupling between said primary conducting path and each of said secondary conducting paths taken individually.

2. A structure as defined in claim 1, wherein each of the conducting paths of said secondary structure are wound on associated segments of the said two flux paths respectively, said primary conducting path comprising two serially connected portions, each of said portions being tightly coupled to a corresponding secondary conducting path.

3. A structure as defined in claim 1 wherein said primary conducting path is wound entirely on the common segment of said two flux paths, the two conducting paths of said secondary structure passing either side of said common segment of said flux paths without encircling it.

4. A structure as defined in claim 2 wherein said conducting paths consist of planar windings.

5. A structure as defined in claim 3 wherein said primary conducting path consists of a planar winding, said secondary structure being formed in a plane from a single conducting sheet.

6. The structure as claimed in claim 1 wherein said core includes a gap along the common segment to interrupt the dc flux path without interrupting the ac flux.

* * * * *